Patented Dec. 29, 1925.

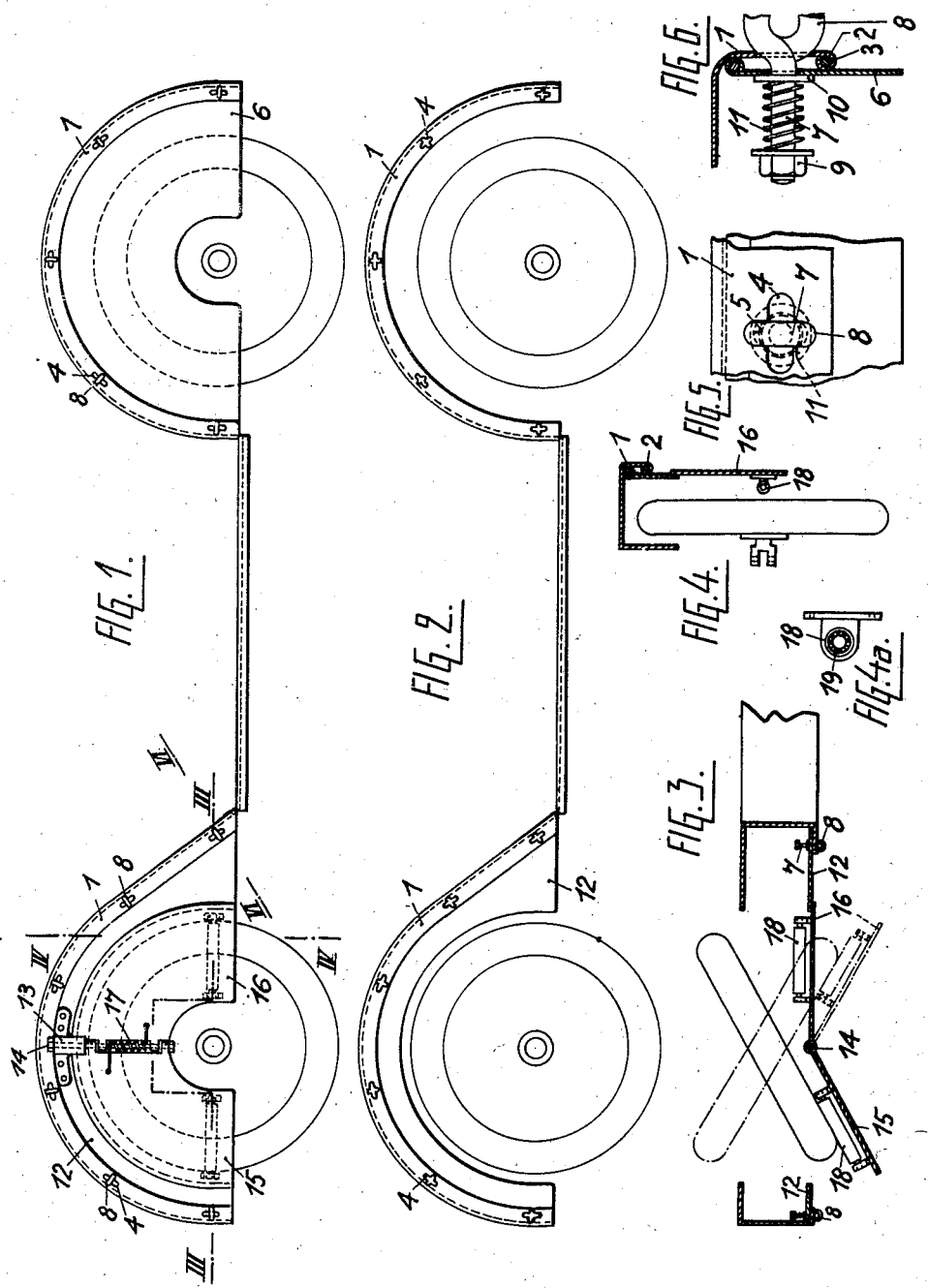

1,567,777

UNITED STATES PATENT OFFICE.

JOSEPH JOHN WAMPACH, OF BERLIN-CHARLOTTENBURG, GERMANY.

MUD GUARD FOR MOTOR VEHICLES.

Application filed February 27, 1925. Serial No. 12,007.

*To all whom it may concern:*

Be it known that I, JOSEPH JOHN WAMPACH, a citizen of the United States of America, residing at Berlin-Charlottenburg, Germany, have invented certain new and useful Improvements in Mud Guards for Motor Vehicles, of which the following is a specification.

My invention relates to mud guards for motor vehicles and more especially to attachments adapted to be applied to the mud guards hitherto used. It is an object of my invention to supplement the usual mud guards by said attachments so as to prevent soiling of those parts of the vehicle which are not protected by these guards.

In the drawings affixed to this specification and forming part thereof a device embodying my invention is illustrated diagrammatically by way of example.

In the drawings:

Fig. 1 is an elevation of the lower parts of a motor car, the mud guards of which are equipped with my novel attachment, Fig. 2 is a similar illustration of the mud guards with the principal parts of the attachment removed, Fig. 3 is a horizontal section on the line III—III in Fig. 1, Fig. 4 is a vertical section on the line IV—IV in Fig. 1, Fig. 4ᵃ shows a detail on a larger scale, Fig. 5 is a front elevation illustrating on a larger scale the means for securing the attachment to a wing of the mud guards, and Fig. 6 is a section on the line VI—VI in Fig. 1.

The wings of the mud guard have vertical flanges 1 on the outside. Preferably the edges of the flanges are beaded at 2 and strengthened by insertion wire 3 (as shown in Fig. 6). Longitudinal slots 4 with extensions 5 at right angles to the slots are formed on the flanges 1.

The attachment is adapted to be secured to the wings by means of these slots as will be described further below. The attachment for the mud guards of the non-steered wheels, as a rule the rear wheels, is a semi-circular or substantially semi-circular plate 6 which is recessed to leave room for the axle. The plate is secured in the slots 4, 5 by means of bolts 7, the heads of which are bent to annular shape in order to facilitate the handling of the bolts. A nut 9 is placed on the threaded inner end of each bolt and a coiled spring 11 is inserted between the nut and a washer 10 on the inner surface of the plate 6. By pulling out the annular head 8, the bolt 7 can be displaced against the action of the spring 11.

The plate 6, the edge of which may be beaded and equipped with insertion wire like the flange 1, is placed against the flange 1 and secured thereon by a plurality of bolts 7. The bolts are held in holes of the plate 6 and their annular heads 8 are so adjusted as to enable them to pass through the slots 4. When the plate 6 is in position on the flange 1, the bolts are turned 90° so that their heads partly enter the transverse extensions 5 of the slots 4 under the action of the springs 11, and are secured therein in such a manner as to be readily detachable.

The mud guards of the front or steering wheels are equipped with a crescent shaped attachment 12 which is secured to the flange 1 of the wing by means of bolts 7 as described with reference to the plate 6. The inner diameter of the crescent 12 is somewhat larger than that of the wheels so that a wheel can freely move in the corresponding crescent. A bracket 13 is secured at the top of the crescent 12 and a vertical bolt 14 is held in the bracket. Segment-shaped flaps 15 and 16 hinged to this bolt are recessed at their inner ends for the axle journal. The outer edge of each flap projects slightly beyond the inner edge of the crescent 12 and the flaps 15, 16 are held to the crescent by a spring 17 on the bolt 14. A roller 18 is secured on the inside of each flap 15 and 16 in the vicinity of their horizontal lower edges and extending in parallel thereto. The rollers 18 are carried in ball bearings 19 as shown in Fig. 4ᵃ.

The plate 6 and the flaps 15, 16 guard the wheels to the extent required for protecting the car body and the passengers from splashes.

The swivelling motion of the steering wheels is accounted for by the hinged and resilient arrangement of the flaps 15, 16 which are free to turn on their hinge bolt 14 against the action of the spring 17 when the wheel engages one of the rollers 18, as indicated in full lines on the left hand side, and in dot-and-dash lines on the right hand side of Fig. 3. When the wheel returns to its normal position, the spring 17 returns the flap 15 or 16 which has been deflected.

The rollers 18 act as antifriction bearings between the wheels and the flaps so that wear and damage to the wheels, the tires and the flaps are prevented.

The flaps, the crescent 12 and the plate 6 may be made of any suitable material, such as sheet metal, celluloid or the like.

It will be understood from the foregoing description that the attachment is readily detachable without the aid of tools when not required, for instance on a dry road or in case of repairs, and is as readly placed in position. I wish it to be understood that I do not desire to be limited to the exact details of construction shown and described, for obvious modifications will occur to a person skilled in the art.

I claim:

Mud guard for motor vehicles comprising a vertical flange on the guard, a crescent shaped attachment adapted to be secured to said flange, headed bolts extending through elongated registering slots in said attachment and said flange, coiled springs encircling said bolts so as to hold said attachment applied against said flange, a hinge bolt mounted on said attachment, spring-controlled flaps hinged to said bolt and a roller on the inside of each flap and adapted to be engaged by said wheel.

In testimony whereof I affix my signature.

JOSEPH JOHN WAMPACH.